United States Patent
Jacumet (10) Patent No.: US 6,749,304 B2
(45) Date of Patent: Jun. 15, 2004

(54) DEVICE IN OPTICAL REPRESENTATION SYSTEMS OF A MOTION PICTURE OR MOVIE CAMERA

(75) Inventor: Klaus Jacumet, Munich (DE)

(73) Assignee: Arnold & Richter Cine Technik GmbH & Co. Betriebs KG, Munich (DE)

(*) Notice: Subject to any disclaimer, the term of this patent is extended or adjusted under 35 U.S.C. 154(b) by 0 days.

(21) Appl. No.: 10/258,052
(22) PCT Filed: Apr. 17, 2001
(86) PCT No.: PCT/DE01/01519
§ 371 (c)(1), (2), (4) Date: Oct. 17, 2002
(87) PCT Pub. No.: WO01/81995
PCT Pub. Date: Nov. 1, 2001

(65) Prior Publication Data
US 2003/0147049 A1 Aug. 7, 2003

(30) Foreign Application Priority Data
Apr. 17, 2000 (DE) .......... 100 20 307

(51) Int. Cl.⁷ .............. G03B 3/00; G03B 13/24
(52) U.S. Cl. .............. 352/171; 396/150
(58) Field of Search .............. 396/150, 151, 396/152; 352/171

(56) References Cited

U.S. PATENT DOCUMENTS

| | | | |
|---|---|---|---|
| 3,661,065 A | * 5/1972 | Yamazaki et al. | 396/152 |
| 4,101,916 A | 7/1978 | Gottschalk et al. | |
| 4,390,239 A | 6/1983 | Huber | |
| 4,693,577 A | 9/1987 | Sasagaki et al. | |
| 5,802,406 A | 9/1998 | Otaki et al. | |

FOREIGN PATENT DOCUMENTS

| | | |
|---|---|---|
| CH | 6172/74 | 5/1980 |
| DE | 2 016 183 | 10/1970 |
| DE | 1 945 486 | 3/1971 |
| DE | 27 34 792 C2 | 2/1978 |
| DE | 30 38 389 A1 | 4/1981 |
| DE | 30 18 449 C2 | 11/1981 |
| DE | 32 24 227 C1 | 12/1983 |
| DE | 35 37 742 A1 | 3/1986 |
| DE | 39 37 885 A1 | 5/1991 |
| DE | 42 00 561 | 7/1993 |
| DE | 196 26 878 A1 | 1/1998 |
| GB | 2 122 769 A | 1/1984 |

OTHER PUBLICATIONS

English translation of International Preliminary Examination Report of PCT/DE01/01519, dated Jul. 16, 2002.

International Search Report of PCT/DE01/01519, dated Sep. 17, 2001.

International Preliminary Examination Report of PCT/DE01/01519, dated Jul. 16, 2002.

* cited by examiner

Primary Examiner—Russell Adams
Assistant Examiner—Arthur A Smith
(74) Attorney, Agent, or Firm—Christie, Parker & Hale, LLP (57) ABSTRACT

The invention relates to a device for improving image quality in focusing screens of an optical representation system of a movie camera, having a movably mounted translucent disk in a sandwich structure, a drive device moving the movable disk in the plane of the disk and a stationary disk mounted parallel to the plane of the movable disk with an image field marking. The drive device is connected to the movable disk and moves the movable disk at least temporarily, for instance during the "standby mode" of the movie camera, at a frequency depending on the image frequency of the movie camera, the video frequency of a video reflecting device of the movie camera or motion picture camera or the brightness of the image or subject to be recorded or with a high motion frequency independent of the operating state of the movie camera.

32 Claims, 7 Drawing Sheets

DEVICE IN OPTICAL REPRESENTATION SYSTEMS OF A MOTION PICTURE OR MOVIE CAMERA

CROSS-REFERENCE TO RELATED APPLICATION

This application is a National Phase Patent Application of International Application Number PCT/DE01/01519, filed on Apr. 17, 2001, which claims priority of German Patent Application Number 100 20 307.8, filed Apr. 17, 2000

BACKGROUND OF THE INVENTION

The invention relates to a device in optical representation systems of a motion picture camera.

For visually judging an image or subject which is to be taken, more particularly for judging the sharpness of the image, so-called focusing screens are known in the form of matt discs or fiber plates in the viewfinder or video beam path of a motion picture film camera. Matt discs are matted for this purpose either through a grinding process or through a chemical etching process. Fibre plates on the other hand are produced from a bundle of individual parallel-aligned light-conductive fibres.

Both types of focusing screens have a structure which is obtrusive, particularly in the case of small-format images as are customary in film pictures. These structures can indeed be reduced in the case of a matt disc by using a particularly fine grinding particle size during the grinding process, but the matt disc can become too transparent so that it is difficult to judge the optimum focus setting and the brightness of the image becomes uneven. The same drawbacks occur in the case of matt discs which are coated on their matt surface with a transparent lacquer in order to reduce the graininess.

Fibre plates have the advantage over matt discs in that their structure is smaller, however they are more expensive than matt discs and particularly when used with smaller apertures of the imaging lens they can detect a regular mostly honeycombed structure which destroys the artistic judgement of the image or subject.

The structures which are to be seen in the focusing discs can thus be recognised with a clarity which is greater the more the object lens of the film camera is faded out. Matt discs thereby act to provide a blackened soot effect.

In order to reduce the troublesome structures which appear, i.e. the graininess and honeycombed structure a translucent image screen is known From German Patent Specification 2 016 183 which consists of two plates with an elastic transparent filler compound in between which forms a layer which adjoins at least in parts both scattering surfaces. The plates are connected to a drive device which moves the plates relative to each other at a frequency which is clearly above the temporal resolution capacity of the eyes of about 60 Hz. By means of such an arrangement it is possible to eliminate or at least significantly reduce the appearance of graininess and the honeycombed structure.

For an extensive visual judgement of the image quality however it is necessary to provide on a translucent focusing disc an image field marking which indicates the outer limits of the image or subject which is to be recorded and which is provided in the form of format markings on the surface of the focusing screen, In order that the image field markings can be better detected if the amount of light passing through the camera lens is low the format marking can be illuminated directly or indirectly through a light source mounted in the camera so that even with unfavourable light conditions the markings remain visible to the operator in the viewfinder of the camera.

However reducing or eliminating the structures in the case of matt discs and fiber plates by moving the focusing screen leads to smudging of the image field marking as a result of the moved focusing screen and thus leads to faulty detection of the image field limits. Also movement of the combination of focusing screens formed from plates cemented together leads to faulty judgement of the image quality, i.e. the image field definition and image sharpness, so that either an increased detectability of the graininess or a lacking detectability of the image field marking has to be accepted.

From U.S. Pat. No. 5,802,406 a photographic system is known for a camera viewfinder with a focusing screen which is mounted in the representation plane of the object lens and has a semi-transparent section which encloses a rectangular completely light-transparent photographic area surrounded by a frame on which the recording subject is represented. A circular photometric area is arranged in the completely transparent photographic region and reproduces the area analyzed by a photometric device The transparent photographic area, the photometric area and a marking indicating the center of the transparent photographic area are arranged as image field markings on the focusing screen.

From CH A 617 274 a camera viewfinder is known which is mounted in the reflected beam path of a rotating aperture which alternately releases the recording beam path for the exposure of the moving film and deflects it in the viewfinder beam path. The camera viewfinder contains a matt disc which has on one side a matt surface and on the other side a line pattern of light-reflecting material for the image field definition. The viewfinder contains an eyepiece and a beam divider which reflects the recording beam path passing through the matt disc to the eyepiece. Furthermore a lighting arrangement is provided in the viewfinder by means of which light is directed through the beam divider to the light-reflecting material whereby the light reflected by the light-reflecting material is sent back to the beam divider and is supplied from here to the eyepiece.

The object of the present invention is therefore to provide a device in optical representation systems of a film camera of the type mentioned at the beginning which improves the image quality on focusing screens and which enables optimum judgement of an image represented on the focusing screen (matt disc or fibre plate) without soot effects, troublesome graininess or honeycombed structure, guarantees satisfactory recognition of the image field definitions and avoids interference and thus ensures a satisfactory image viewing without troublesome side-effects.

This is achieved according to the Invention through a device having the features of claim 1.

SUMMARY OF THE INVENTION

The solution according to the invention improves the image quality on focusing screens in optical representation systems of a film camera, guarantees an optimum judgement of an image represented on the focusing screen (matt disc or fibre plate) without soot effects, troublesome graininess or honeycombed structure, as well as a satisfactory detection of image field definitions, avoids interference and thus guarantees a satisfactory recognition of image field definitions without troublesome side effects.

The solution according to the invention is particularly suitable for video reflecting devices in motion picture film recording cameras since the Improvement which can be achieved with the invention in the image quality of a focusing screen can indeed be seen in a normal viewfinder but is most clearly apparent however in a video reflecting device and avoids interference and the appearance of flickering effects.

In order to avoid parallax errors according to a further feature of the invention the distance between the movable disc and stationary disc is minimal.

An advantageous development of the solution according to the invention is characterised in that the movable disc is mounted so that it is movable solely in the plane of the disc.

By precisely guiding the movable disc in its plane a situation is avoided where the camera lens is no longer correctly focused or falsely set as a result of a deviation of the disc in the beam direction.

In order to eliminate completely the visual impression of graininess on a matt disc or honeycombed structure on a fibre plate according to a further feature of the solution according to the invention the drive device moves the movable disc with a frequency which is dependent on the image frequency of the film or video camera. Since the motion frequency of the moved disc is set In relation to the Image frequency Interference phenomena can be avoided and thus a satisfactory image consideration can be ensured without troublesome side effects.

As an alternative or in addition to this the drive device which is connected to the movable disc can move the movable disc with a frequency which is dependent on the brightness of the image or subject being recorded. Since the brightness influences the opening of the camera aperture and with a little opened aperture the so-called soot effect appears more strongly, with a wide opened recording aperture the motion frequency of the moved disc can be reduced without having to accept losses in the quality of the image consideration.

Preferably the movable disc is mounted movable in the plane of the disc and executes an eccentric more particularly irregular movement. The irregularity in the movement of the movable disc avoids on the one hand reversal points in an oscillating movement where the graininess is again to be observed, and on the other hand renewed detection of grains cannot occur as a result of periodic recurrence of image spots at the same place on the matt disc or fibre plate.

In an advantageous development of the solution according to the invention the movable disc executes a movement which results from superimposing two periodic movements running in directions at right angles to each other, i.e. describes so-called Lissajous figures.

As an alternative to this the movable disc executes a movement which is similar to the movement of an arm of a four-armed gearbox.

Furthermore the motion frequency of the drive device can be coupled timewise or speedwise with the image frequency of the film camera or the video frequency of a video reflecting device of the film camera whereby preferably the motion frequency is In a not whole number ratio to the image frequency of the film camera or video frequency of the video reflecting device.

This measure avoids the risk of interference occurring or periodically recurring settings and thus optimises the image judgement without disturbing side effects.

As regards the type of movement of the movable disc it is immaterial whether the movable disc carries out only part of a complete movement or even several complete movements within one time period in which light is available in the viewfinder beam path, so long as the focusing screen is moved over a distance from one grain to the next on a matt disc or from one fibre to the next on a fibre plate within the perception limits of the human eye or a video reflecting device mounted where required in the viewfinder path.

An advantageous development of the solution according to the invention is characterised in that the movable disc is moved at least at times by the drive device.

Since the image impression is particularly relevant in the standby mode of the film camera, in one development of the solution according to the invention the movable disc is moved in the standby mode of the film camera and is stopped during the run mode of the film camera so that camera noises are minimized. This is particularly advantageous in the case of so-called sound-sync cameras.

A further development of the solution according to the invention is characterised in that the movable disc is moved independently of the operating stage of the film camera with a high motion frequency, which is a particularly satisfactory solution in the case of so-called non-sound-sync cameras.

The drive device for the movable disc can be formed in different ways. Thus there is the possibility of connecting the drive device to the film transport mechanism of the film cameras through a gearing unit or to couple the drive device to an aperture drive for a rotating reflex aperture of a film camera.

Furthermore the drive device can consist of at least one eccentric motor connected directly or indirectly to the movable disc.

As an alternative to the eccentric motor it is possible to provide for example selectively a piezo element connected to a side edge of the movable disc, a push rod or a lift magnet as the drive device or to mount a movable disc connected to metal or magnetic parts in an inductive or capacitive field so that through corresponding excitation the movable disc executes movements which are predetermined through the field changes.

Where the focusing screen is comprised of two parallel translucent plates which are connected together by a cement material the drive device engages on this sandwich-structure focusing screen whilst a focusing screen supporting the image field markings is mounted stationary in the image field area of the movable disc.

In a further embodiment the movable disc and the stationary disc with image field marking can be formed from parallel translucent plates between which an optical medium is located in the form of a gas, fluid or elastic solid bodies.

In this embodiment the drive device engages on the movable disc whilst the other disc is mounted locally fixed. The discs can execute relative movements to each other through the optical medium.

This solution has proved particularly space saving and by integrating the measures which reduce the graininess the problem posed can be solved with an extremely compact effective device for improving the image quality on focusing screens in optical representation systems of a film camera or a video reflecting device of a film camera.

The connection of the plates or discs is carried out substantially over the entire surface areas of the plates with a translucent optical medium. The refraction at the matted surface of the plates hereby takes place not opposite air but opposite the optical medium and the scatter behavior of the matted surfaces can be influenced through the corresponding choice of optical medium and can be tuned in optimum manner to the relevant use.

Preferably the material of the plates or discs has an optical medium refraction index which is higher by at least a factor of 1.1, and more particularly by a factor 1.15 to 1.3.

In order to be able to detect the image field marking of the stationary disc even in poor lighting conditions a light source is provided inside the camera to beam on the stationary disc.

The sequence of the optically active elements of the device according to the invention is basically in any order for the desired effect like the relevant sides of the optically active elements, but there are specific advantages depending on the sequence.

Thus in a first arrangement the movable disc faces the camera lens with its non-matted side, whilst the stationary disc faces the matted side of the movable disc with its format marking. With this arrangement the shortest possible distance is achieved between the plane of the matt disc and the format marking.

In a second arrangement the movable disc faces the camera lens with its matted side and the stationary disc faces the non-matted side of the movable disc with its format marking.

With this arrangement the distance between the plane of the matt disc and the format marking is indeed greater by the thickness of a glass plate but the bearing dimension for this, i.e. the distance between the lens fixing and the image window of the camera, can be measured more easily.

Finally the stationary disc which faces the camera lens with its normal glass side can be turned so that its side supporting the format marking faces the matted side of the movable disc. This makes it possible to change the format markings more easily.

BRIEF DESCRIPTION OF THE DRAWINGS

The idea on which the invention is based will now be described in further detail with reference to the embodiments illustrated in the drawings in which.

DETAILED DESCRIPTION OF EXEMPLARY EMBODIMENTS OF THE INVENTION

Figure 1:
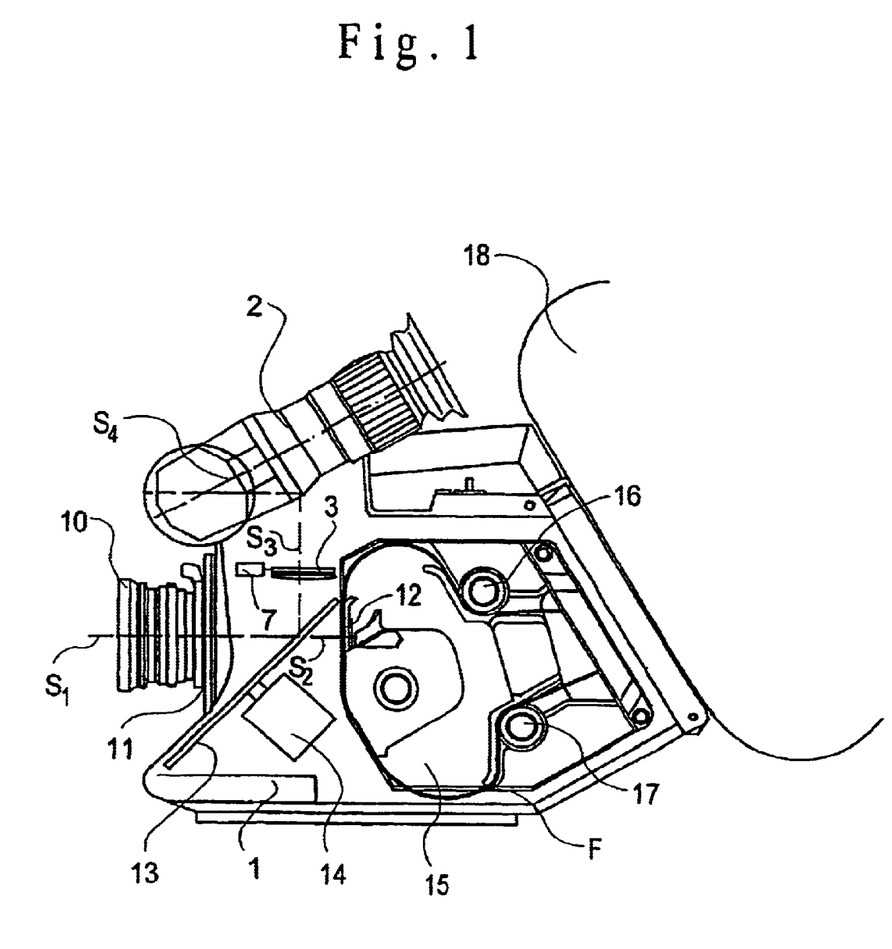
FIG. 1 shows a partial sectional side view of a motion picture film recording camera.
Figure 2:
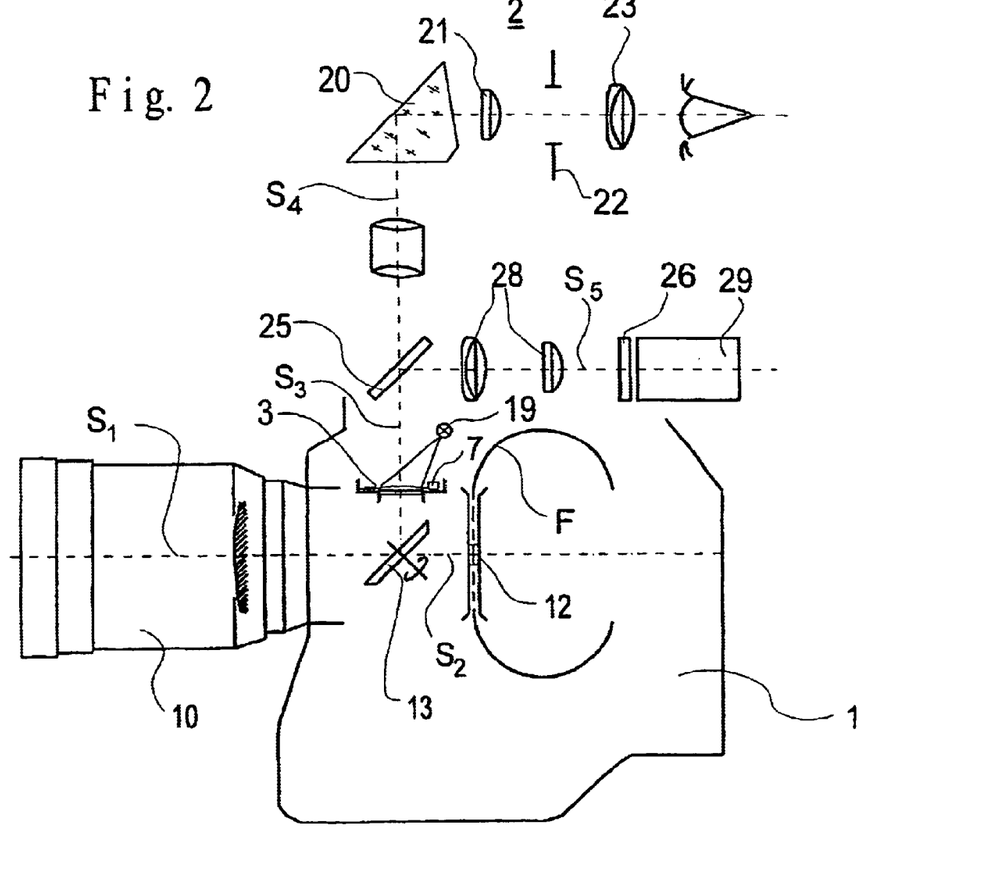
FIG. 2 shows a diagrammatic view of the film recording beam path, viewfinder and video beam paths branched off therefrom as well as the optical elements in the film recording, viewfinder and video beam path.

FIG. 1 shows a partial sectional side view of a motion picture film recording camera and FIG. 2 shows a diagrammatic view of the beam paths of the motion picture camera with a viewfinder magnifying optic and a video reflection. The motion picture camera has a camera housing 1 shown partly in section with a camera cassette 18 fixed thereon which contains a film unwind spool and a film take-up spool. The camera housing 1 is provided with a lens holder 11 for fixing alternative lenses on the film camera. An image window 12 is mounted in the optical axis of the lens 10 in the camera housing 1 whereby the motion picture film F is moved intermittently past the window.

The camera housing 1 contains furthermore a film transport mechanism 15 for a gripper switch mechanism of the film camera as well as for toothed rollers 16, 17 for drawing off and rewinding the motion picture film F in and out of the camera cassette 18.

A rotating reflex aperture 13 driven by an aperture motor 14 releases the film recording beam path S1 falling through the lens 10 periodically as the film exposure beam path S2 to expose a film image of the film F standing in the film window 12, and reflects the film recording beam path S1 during the film transport as the reflective beam path S3 to a beam divider 25 from which a viewing beam path S4 branches off to a viewfinder eyepiece 2 and a video beam path S5 branches off to a video recording device or CCD video chip.

The optical path from the lens support 11 to the film window 12 or to the film F and the optical path from the lens support 11 to the matted surface of the matt disc is the same. The image projected there in the exposure pause for the motion picture film F is divided up according to FIG. 2 at a beam divider 25 into a viewing beam path S4 and a video beam path S5.

The viewing beam path S4 is guided by a deflection prism 20 into a direction suitable for the recording requirements and the viewfinder image is represented by a transfer optic 21 as a real image in the plane of an image field aperture 22 where it can be viewed through an eyepiece 23. The video beam path S5 passes through a video optic 28 to a CCD image converter 26 which is connected to a video electronics system 29. A video discharged by the video electronics unit 29 can be processed and moved on in the conventional manner and can be supplied for example to a monitor on which a video image of the object lens can be represented, or to a video recording device which stores the video recordings.

On the optically identical plane as the image plane a device is mounted in the reflective beam path S3 for judging or viewing the image, the device 3 comprising a matt disc or a fibre plate and onto which a representation of the object being recorded is reflected when the reflective surface of the rotation reflex aperture 13 is located in the film recording beam path S1 whilst the film transport mechanism moves the film F on by one film image in the image window 12.

Figure 3:
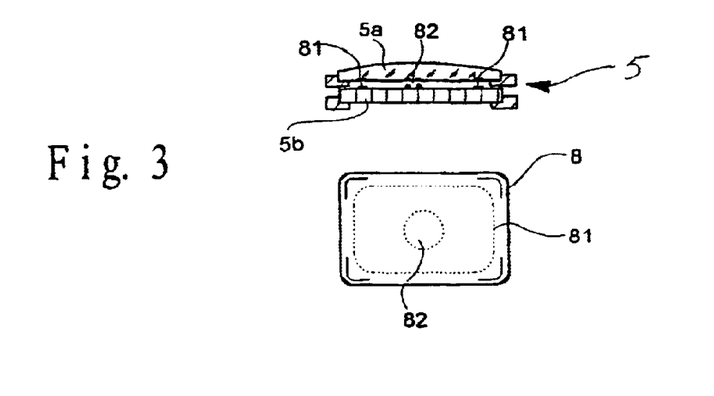
FIG. 3 shows a section through a stationary disc of the type used up until now with image field marking and a plan view of the image field marking.

FIG. 3 shows a cross section through a field lens 5a and a cross section through a fibre plate 5b of an earlier type with image film markings 81, 82 and in plan view a projection onto a viewfinder image 8 visible through the viewfinder 2 of a format marking visible to the viewer through the viewfinder 2 according FIG. 1. The viewfinder image has an image field definition 81 and a centre marking 82 by means of which in poor lighting conditions the recorded image section can be fixed. Additional markings can reproduce different image formats so that by way of example image formats suitable for television recordings can also be marked.

Figure 4:
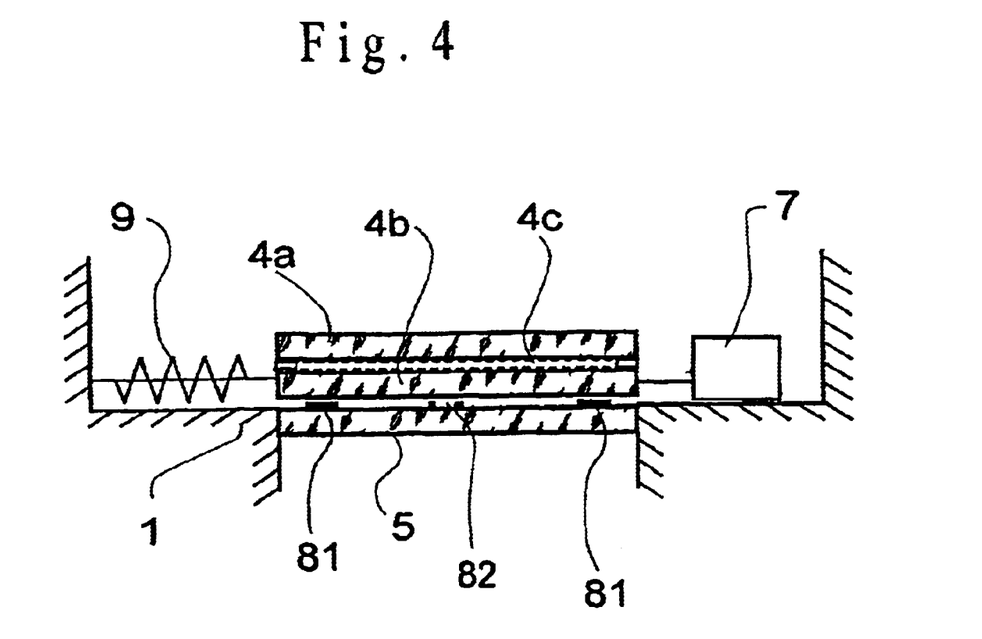
FIG. 4 shows a diagrammatic view of a device for the image projection with separate movable and stationary discs.

The device 3 for judging the image is comprised according to an exemplary embodiment of the invention according to the illustration in FIG. 4 of a disc 4a, 4b, 4c having a sandwich construction and being horizontally movable in the plane of the disc and connected to a drive device 7. The disc is aligned with an interchangeable stationary disc 5 having image markings 81, 82 and is connected to the camera housing 1. The movable disc consists in this embodiment of two parallel translucent plates 4a, 4b. One of the two inner faces of the translucent plates 4a, 4b has a light-scattering surface and between the two plates 4a, 4b there is an optical medium in the form of a cement material 4c.

When the movable disc is comprised of two parallel translucent plates 4a, 4b these preferably consist of glass whereby one of the inner faces is matted. The advantage of an inner matted face is that it is very insensitive to external influences whilst finely polished conventional malt discs react very sensitively to slight traces of grease or damp.

The plates 4a, 4b can however also be made from a translucent plastics or other translucent materials. Furthermore the plates 4a, 4b need not be made from the same material. It is also not necessary for them to have the same size.

The matting of the surface of one of the plates 4a or 4b is preferably achieved by grinding, particle-spraying or if the plates are made of glass by etching with hydrofluoric acid. Furthermore it is also possible to coat the surfaces with a matted layer, e.g. of plastics. Furthermore plates can also be used which have layers which are matted by introducing scattering centres, for example material with deviating refractive indices.

The stationary disc 5 supports according to FIG. 3 and 4 image field markings or format marks 81, 82 for example in the form of a chromium mask. The image field markings 81, 82 can be applied on the side towards the matted surface as a layer or can be arranged in indentations in the stationary disc 5.

As shown in FIG. 2, a light source 19 mounted in the camera housing 1 can be provided additionally to illuminate the image field marking and this also makes it possible to clearly recognised the image field definitions in the event of poor lighting conditions. The lighting source 19 can consist of a light diode, UV light or the like and can be arranged so that the viewfinder image is subject to optimum illumination.

Figure 5:
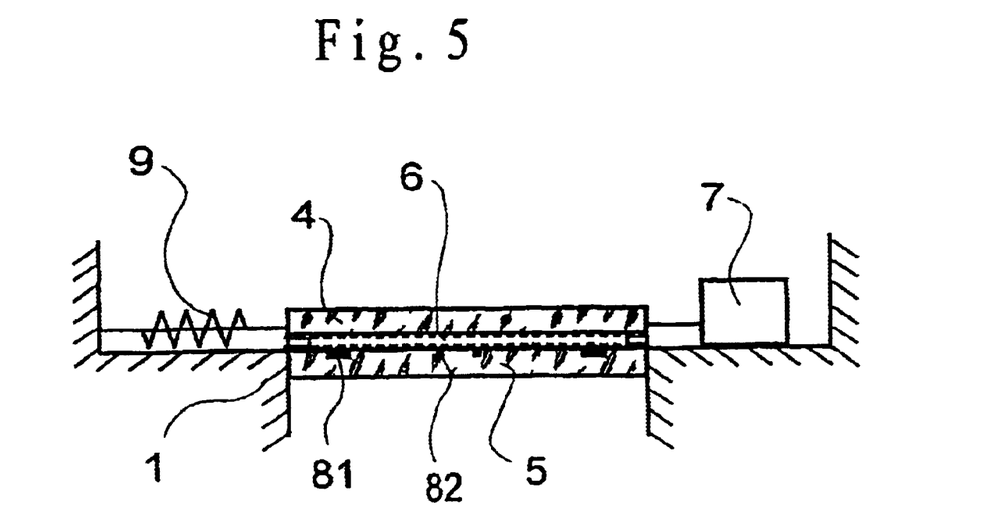
FIG. 5 shows a diagrammatic view of a device for image projection with movable and stationary discs connected together in sandwich construction.

Instead of a separate arrangement of a movable disc 4a, 4b, 4c in sandwich construction and a stationary disc 5 the focusing screen can be provided not in a sandwich construction but can consist of a movable disc 4 and a stationary disc 5 with an optical medium 6 between the facing surfaces of the movable disc 4 and stationary disc 5 as shown in FIG. 5.

The movable disc 4 hereby fulfills the same task as the two plates 4a and 4b which form the movable disc. In the combination of the movable disc 4 and stationary disc 5 as well as the optical medium 6 sufficiently encapsulated in between to make up a combined focusing screen, the stationary disc 5 is connected locally fixed in the region of the image plane to the camera housing 1 according to FIG. 1 whilst the movable disc is connected to a corresponding device 7 and is movable horizontally-and freely relative to the stationary disc 5.

Figure 6:
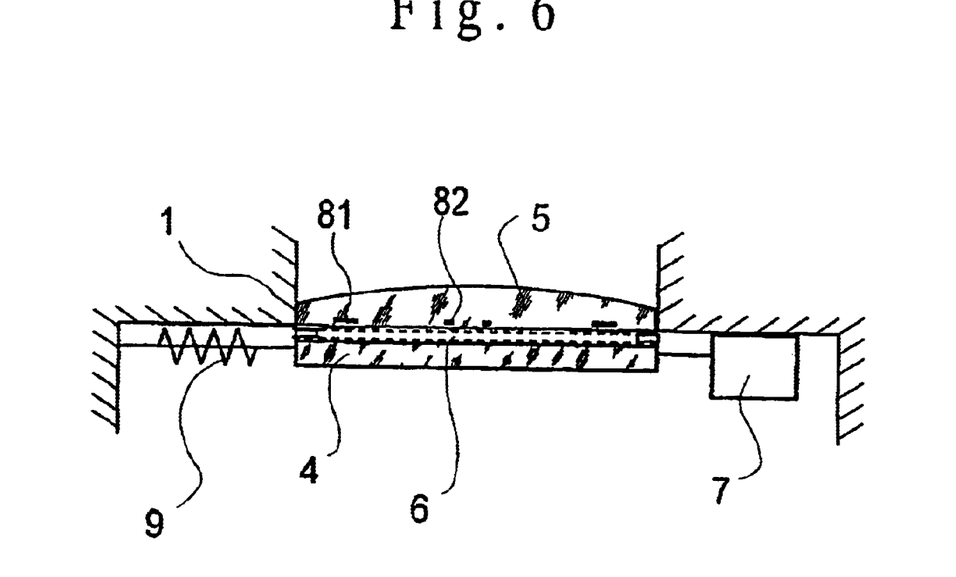
FIG. 6 shows a diagrammatic view of a device for image projection with stationary disc formed as a field lens and mounted above the movable disc.

It is important in the case of a design with a movable and stationary disc that the movable disc only consists of a flat-parallel optic since otherwise the optical axis is moved as well which is unacceptable for the viewer. If the stationary disc lies in the viewing direction underneath the movable disc then this must also be formed flat parallel. Only if the stationary disc 5 lies above the movable disc 4 can the function of a field lens be integrated in the same, i.e. its side facing the viewing direction can be formed convex as shown in FIG. 6.

Figure 7:
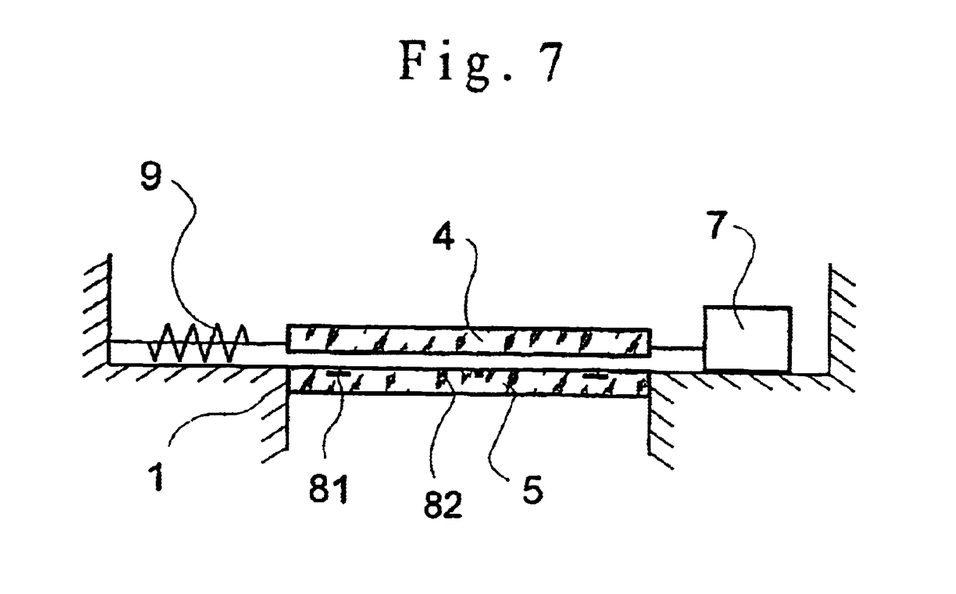
FIG. 7 shows a diagrammatic view of a device for image projection with movable and stationary discs without interposed optical medium.

In the arrangement according to FIG. 7, unlike the previously described devices there is no optical medium 6 between the movable plate 4 and the static plate 5. The side of the movable plate 4 facing the static plate 5 is thereby matted. The matted structure corresponds to that of a normal maft disc, but as a result of the movement of the movable plate 4 has a less disadvantageous effect. Dispensing with an optical medium leads in this case to a simple construction in which the medium need not be encapsulated and the static plate 5 can be simply exchanged with the format markings.

Obviously the device illustrated in FIG. 7 can be constructed without an optical medium between the static plate 5 and the movable plate 4 so that the static plate 5 lies on the top and the curved upper face of a field lens is integrated therewith.

Figure 8:
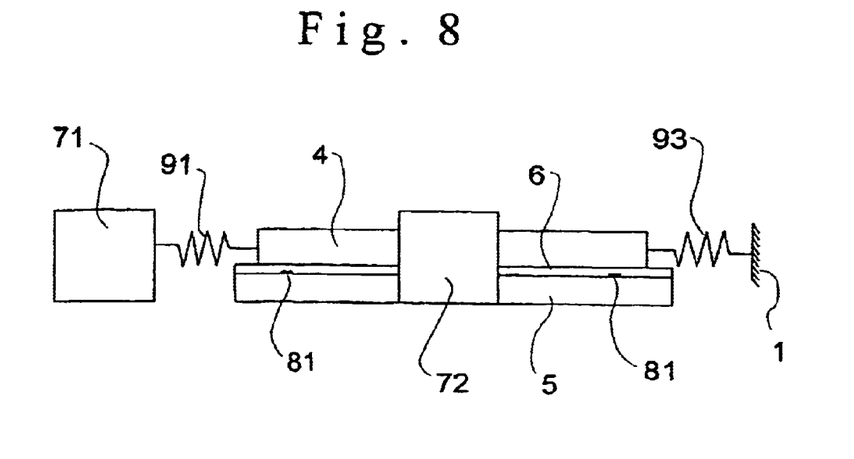
FIG. 8 is a side view of a device for image projection with a movable and stationary disc and two eccentric motors as drive device.
Figure 9:
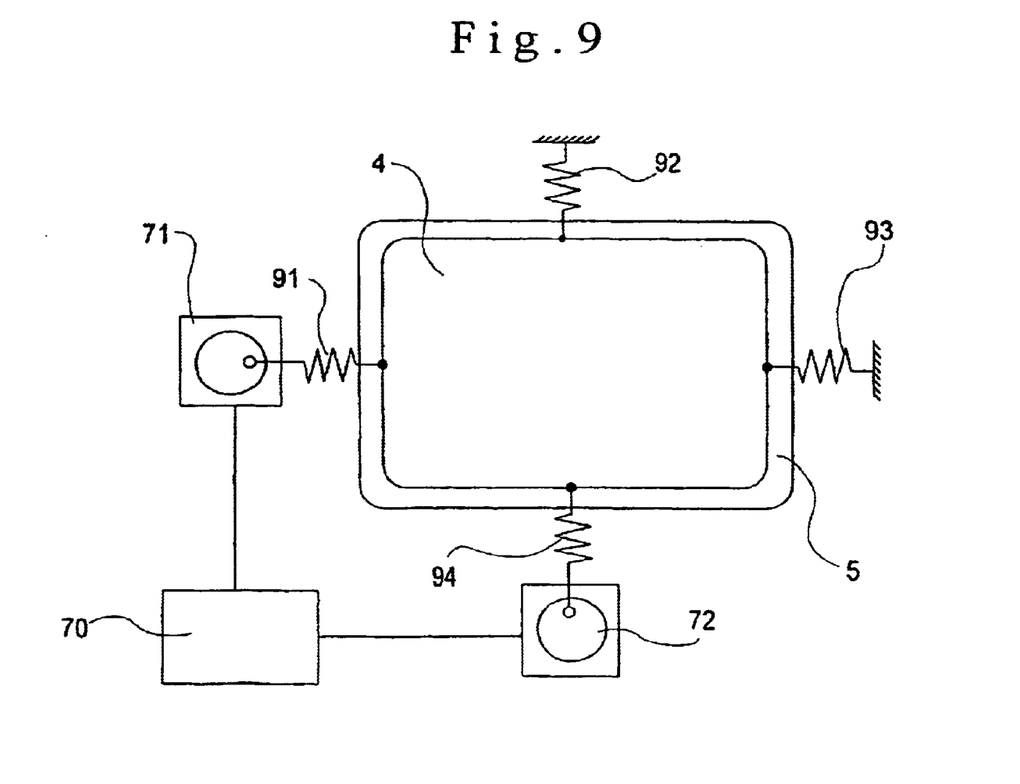
FIG. 9 is a plan view of the device for image projection according to FIG. 8.

FIG. 8 shows diagrammatically in a side view and FIG. 9 in a plan view a device for judging the image in the optical representation systems of a film camera having a movable disc 4 and a static locally fixed and clamped disc 5 which supports image field markings 81. The rectangular movable disc is connected on two adjoining side edges through spring elements 91, 94 to eccentric motors 71, 72 which are controlled by a control device 70. The two other side edges of the movable disc 4 are connected to the camera housing (FIG. 1) through spring elements 92, 93.

As an alternative only one eccentric motor can be provided which is connected through levers mounted perpendicular to the plane of the disc to two adjoining side edges of the movable disc 4 and deflects the movable disc 4 with predetermined motion frequency.

The sequence of the optical elements of the device according to the invention for improving the image quality of focusing screens as well as aligning the matted and non-matted side as well as the side provided with the format marking or the smooth side can be in basically any order for the desired effect. Seen from the camera lens i.e. in the direction of the recording beam path the following sequences can be particularly advantageous:

Non-matted glass side of the movable disc, matted glass side of the movable disc, glass side with format marking of the stationary disc, normal glass side of the stationary disc;

Matted glass side of the movable disc, non-matted glass side of the movable disc, glass side with format marking of the stationary disc, normal glass side of the stationary disc;

Normal glass side of the stationary disc, glass side with format marking of the stationary disc, matted glass side of the movable disc, non-mafted glass side of the movable disc.

Furthermore a medium with different refractive index can be mounted between the two plates.

By means of a switch arrangement which will be described with reference to FIG. 12 the movable disc 4 is set by the eccentric motors 71, 72 in vibrations with a motion frequency with which the graininess of the movable disc 4 becomes visual. By ensuring non-uniform movements and irregular movements of the movable disc 4 and influencing the drive devices 71, 72 through the image frequency of the film camera, interference phenomena and periodically recurring exposures of specific points of the image judging device are additionally avoided.

A special form of the movement of the movable disc 4 is achieved in that the periodic movements emerging from the eccentric drive devices 71, 72 run in two directions perpendicular to each other so that the shape of the resulting movement depends on the frequency ratio and on the phase difference in the two generated movements. With a rational frequency ratio, closed figures arise from this which give the impression of a slow changing figure which in physics are termed Lissajous figures when the frequencies differ only slightly.

Figure 10:
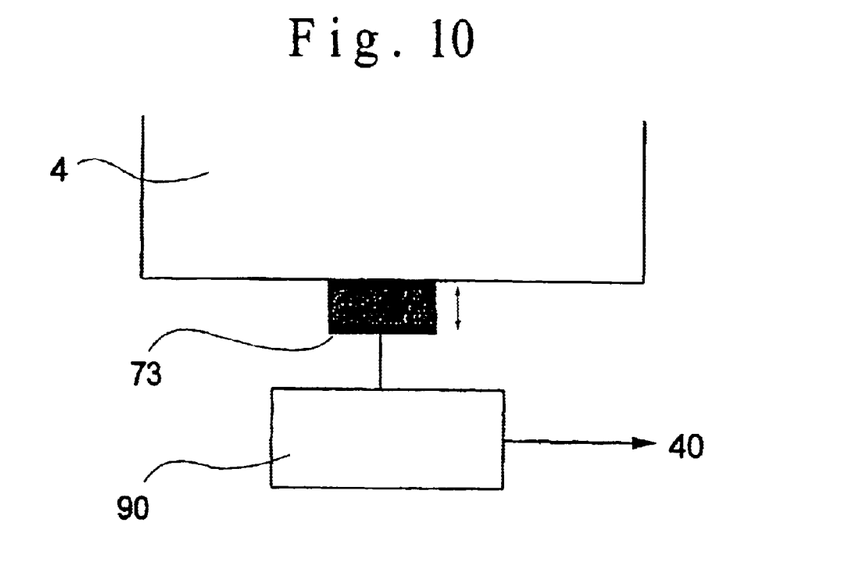
FIG. 10 is a partial view of a drive device with a piezo element.

An alternative drive device shown in FIG. 10 consists of a piezo element 73 whose external dimensions change when applying an electrical field and thus can be utilised to transfer vibrations to the movable disc 4. The piezo element 73 is connected to an oscillator 90 which in turn is attached to the overriding control device of the film camera which is shown in FIG. 12.

Figure 11:
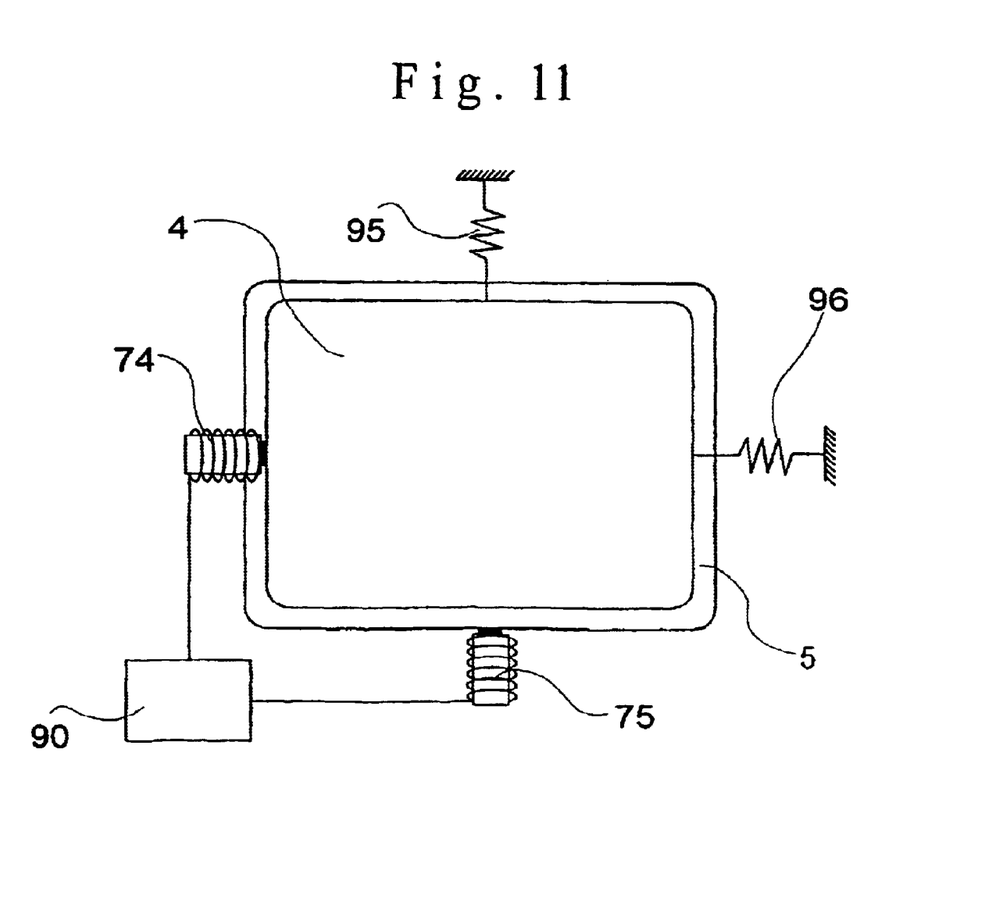
FIG. 11 shows a plan view of a drive device with two lift magnets.

A further embodiment of a drive device for transferring vibrations to the movable disc 4 is shown in FIG. 11 and consists of two lift magnets or moving coils 74, 75 whose armatures are connected to two adjoining side edges of the movable disc 4. The lift magnets 74, 75 are attached to a control device 90 which is connected to the overriding control device of the film camera through the image frequency of the film camera. Through the support of the movable disc 4 by spring elements 95, 96 on the camera housing, irregular movements of the movable disc 4 are generated which are in a non whole number ratio to the image frequency of the film camera.

The deflection of the movable disc 4 can be formed so that this is operated in the normal speed range of the film camera in the resonance vibration mode.

Figure 12:
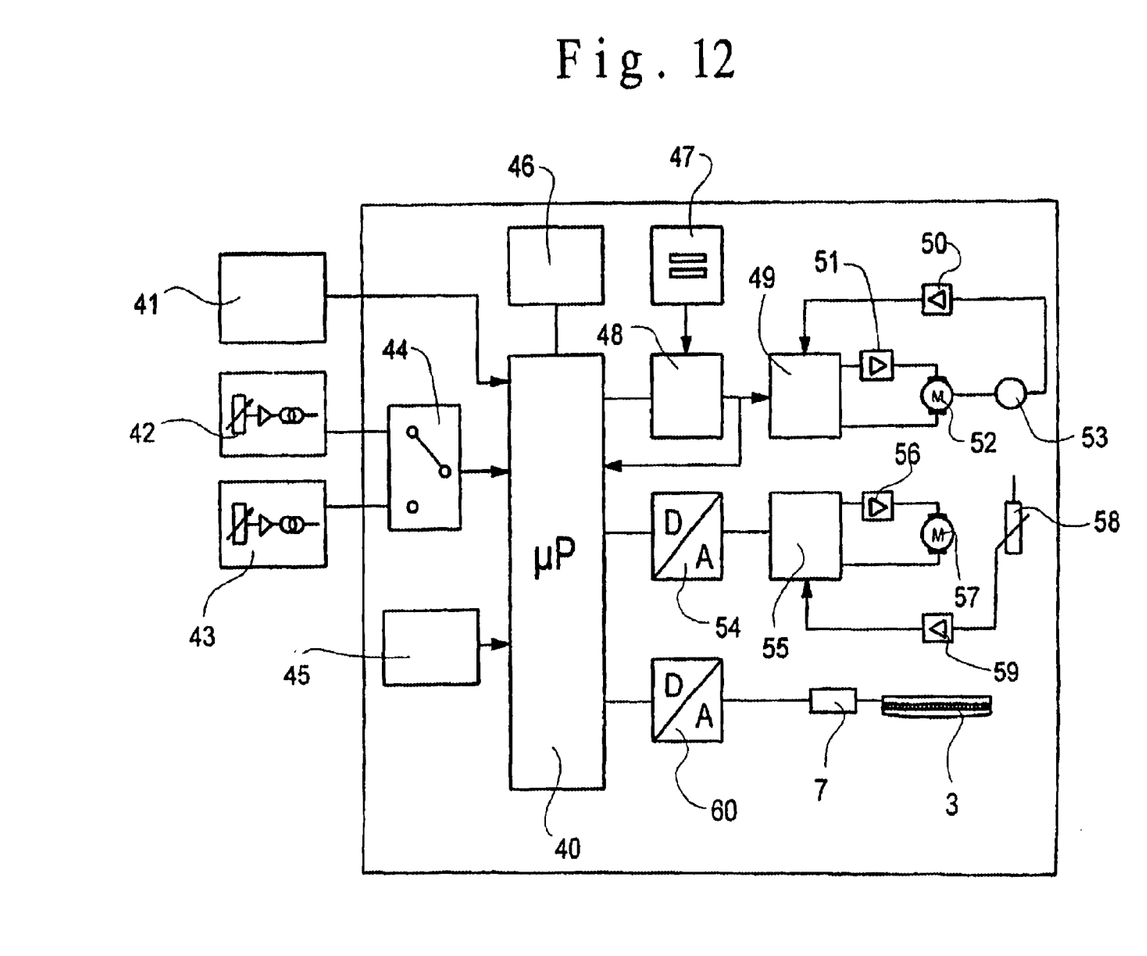
FIG. 12 shows a diagrammatic block circuit diagram for an arrangement for controlling the lighting and transport speed of a motion picture film and the motion speed of a device for image projection.

In the control device illustrated in FIG. 12 as a block circuit diagram there is a film transport motor 52 for transporting the moving film which is connected through a gearing as for example to a gripper switch mechanism. In addition the drive shaft of the film transport motor 52 is fixedly connected to an angle transmitter disc 53 so that by means of an opto-electronic position scanning device the rotational speed or frequency and where necessary the exact position of the film transport motor 52 can be detected and supplied through an amplifier 50 to a speed regulator 49.

The actual value of the transport speed is supplied both to the speed regulator 49 and to a microprocessor 40. The speed regulator 49 is additionally loaded with an ideal value of the transport speed. This ideal value is issued by a synthesiser 48 whose inputs are connected both to an oscillator 47 which sends a reference frequency to the synthesiser 48, and also to an output of the microprocessor 40.

The ideal frequency of the transport speed is additionally fed back to the input of the microprocessor 40. The speed regulator 49 carries out both a speed regulation in :dependence on the ideal value issued by the synthesiser 48 and also a phase comparison between the actual value and ideal value of the phase angle.

An ideal value of the aperture opening angle is sent by the micro processor 40 through a digital/analogue converter 54 to a position regulator 55 which is loaded additionally with an actual value of the aperture opening angle. The position regulator 55 controls through an amplifier 59 an aperture adjustment motor 57 which is preferably connected to the reflex aperture shaft, rotates with the reflex aperture and with a corresponding control through the position regulator 55 causes a relative movement of the aperture adjustment vane relatve to the rotatable reflex aperture.

The aperture adjustment vane of the reflex aperture is connected to a potentiometer 58 which sends a signal corresponding to the position of the aperture adjustment vane relative to the reflex aperture both in the stationary state and in the running state through a second amplifier 59 to the position regulator 55.

In addition an optical sensor 45 can be mounted in the region of the adjustable revolving aperture and during the running of the adjustable reflex aperture detects the relevant aperture opening angle, i.e. the opening time of the revolving aperture, and sends this to a further input of the microprocessor 40 so that system tolerances are eliminated and an additional comparison input in digital form is sent to the microprocessor 40.

The microprocessor 40 is connected to a memory 46 which preferably comprises a read only memory and a memory with random access. An additional input of the microprocessor 40 is connected through a multiplexer 44 to a remote control unit 42, 43 through which ideal values can be set for the transport speed and the aperture opening angle which are triggered by means of a program button on the remote control unit or a program button on the motion picture camera.

The microprocessor 40 is connectable through a serial or parallel interface to a programming device 41 with which ideal values of the transport speed and aperture opening angle can be preprogrammed. The pre-programmed data preferably contain starting and end values of the transport speed and aperture opening angle as well as the time within which the change is to take place. The data input through the programming device 41 are stored in the memory 46 and triggered by a program button on the motion picture camera or the program button on the remote control unit as a sequence of programming steps of different transport speed and different aperture opening angle.

Both the aperture opening angle and the transport speed can be changed through the remote control unit 42, 43. The values set on the remote control unit 42, 43 are sent through an analogue/digital converter to the microprocessor 40 which forwards the digital value of the aperture opening angle to the digital/analogue converter 54 for regulating the aperture opening angle.

Likewise the microprocessor 40 receives a value through the analogue/digital converter for the transport speed with which it adjusts the synthesiser 48 on the output side stable with a fixed digital value. Obviously a voltage/frequency converter can be used in place of an analogue/digital converter.

With the input of the actual value of the transport speed into the micro processor 40 a simple possibility exists of determining the relevant aperture opening angle. By knowing the momentary transport speed the relevant aperture opening angle can be calculated in the microprocessor 40 through the values of each speed detected through the optical sensor so that the aperture opening angle can be checked, e.g., in the run-up phase, and corrected where necessary.

The drive device 7 is connected to the microprocessor 40 through a digit/analogue converter or a voltage/frequency converter 60 to generate vibrations of the, device 3 for image consideration. Depending on the image frequency and/or the image brightness the microprocessor 40 it necessary sends through the digital/analogue converter or the voltage/frequency converter 60 control signals to a control device dedicated to the drive device 7 or directly to the drive device 7 so that the latter controls according to its design the device 3 for image judging with a motion frequency which is preferably in a non whole number ratio to the image frequency of the film camera.

By influencing the motion frequency of the movable disc through the image frequency of the motion picture camera it is possible to match the frequencies with each other so that no troublesome interference phenomena appear whereby the frequency of the movement lies above the resolution of the human eye of about 60 Hz or the resolution of the video-assist. Just slight deflections of the movable disc relative to the stationary disc in the order of few tenths of a millimeter are sufficient here to suppress the graininess of the matt disc.

More particularly by coupling the frequencies it is possible to avoid the frequency of the movable disc from being the same or a whole multiple of the image frequency of the film or video camera since the camera always shows the movable disc under these circumstances in the same position on the image. The situation is received here as if the disc were not moving whereby the graininess would become evident The same applies to the half-number multiples where two positions alternate. However all ratios are favorable between the motion frequency of the movable disc and the image recording frequency and video frequency or repeat frequency especially of the video reflecting device with which no periodically recurring setting of the disc, or one which only periodically recurs after a long time, would be recorded by the video camera.

Also slight deviations of the motion frequency of the movable disc from the image frequency or a multiple thereof have a negative effect since hovering between the frequencies occurs which is perceived as unacceptable by the viewer. By suitably setting the frequency ratios it is possible to overcome this with the device according to the invention.

By linking the control of the film transport mechanism, the rotational adjustable reflex aperture and the device 3 for image judgement 3 by means of the microprocessor 40 it is possible to couple the control of the motion frequency of the device 3 for the image judgement 3 in terms of time or speed to the image frequency of the film camera or video frequency of the video reflecting device whereby the transport speed of the movie film and the exposure time of the rotational reflex aperture which is preferably provided with an adjusting sector can be incorporated independently of each other into the regulation of the motion frequency. Furthermore the setting of an additional aperture formed for example as an iris aperture on the object lens 10, and thus the controlled image brightness can be incorporated into the control of the drive device 3 for the device for the image judgement.

The invention is not restricted in its design to the embodiments described above but a number of variations is possible which make use of the solution represented in the drawings and description even in fundamentally different types of designs. Thus for example video cameras could also be provided with a viewfinder system which corresponds to the viewfinder system of a motion picture camera and has the device according to the invention for improving the image quality of a focusing screen.

What is claimed is:

1. A device in optical representation systems of a motion picture film recording camera comprising at least one movably mounted movable translucent disc said disc being a mounted disc or a fibre plate; a stationary disc with image field marking mounted parallel to the plane of the movable disc, and a drive device which moves the movable disc in the plane of the disc and which moves the movable disc with a frequency dependent on the image frequency of the motion picture film recording camera or the video frequency of a video reflecting device of the motion picture film recording camera.

2. The device according to claim 1 wherein the motion frequency of the drive device is coupled in terms of time or speed to the image frequency of the film camera or the video frequency of the video reflecting device of the film camera.

3. The device according to claim 2 wherein the motion frequency of the drive device forms a non whole number ratio with the image frequency of the film camera or the video frequency of the video reflecting device.

4. The device according to any one of claims 1, 2 or 3 wherein the drive device connected to the movable disc moves the movable disc with a frequency which is dependent on the brightness of the image or subject to be taken.

5. The device according to claim 1 wherein the movable disc is moved at least at times by the drive device.

6. The device according to claim 5 wherein the movable disc is moved in a standby mode of the film camera and is stopped in a run-mode of the film camera.

7. The device according to claim 1 wherein the movable disc is moved independently of the operating state of the film camera with a high motion frequency.

8. The device according to claim 1 wherein the movable disc is deflected so that it is operated in the normal speed range of the film camera in a resonance vibration mode.

9. The device according to claim 1 wherein the drive device is connected through a gear mechanism to a film transport mechanism of the film camera.

10. The device according to claim 1 wherein the drive device is connected to an aperture drive of the film camera.

11. The device according to claim 1 wherein the drive device comprises of at least one eccentric motor which is coupled to the movable disc.

12. The device according to claim 11 wherein the eccentric motor is connected to at least one side edge of the movable disc through at least one lever which is mounted rotatably perpendicular to the plane of the disc.

13. The device according to claim 1 wherein the drive device comprises of at least one piezo element connected to a side edge of the movable disc.

14. The device according to claim 1 wherein the drive device acts through an inductive or capacitive field contactlessly on the movable disc.

15. The device according to claim 1 wherein the spacing between the movable disc and the stationary disc is minimal.

16. The device according to claim 1 wherein the movable disc is positioned so that the movable disc is movable solely in the plane of the disc.

17. The device according to claim 1 wherein the movable disc executes an eccentric circular movement.

18. The device according to claim 1 wherein the movable disc executes an irregular movement.

19. The device according to claim 18 wherein the movable disc executes a movement which results from superimposing two periodic movements running in directions at right angles to each other.

20. The device according to claim 1 the movable disc executes a motion which is similar to the movement of an arm of a four-armed gearing.

21. The device according to claim 1 wherein at least a part of the side edges of the movable disc is supported elastically so that the movable disc is resiliently mounted in the plane of the disc.

22. The device according to claim 1 wherein the movable disc comprises: two parallel translucent plates wherein one of the two plates comprises an inner side having a light-scattering surface; and a cement material which bonds the two plates together.

23. The device according to claim 22 wherein the material of the plates has a refractive index which is higher by at least a factor of 1.1 than the refractive index of the cement material.

24. The device according to claim 1 wherein the movable disc and the stationary disc with image field markings comprise parallel translucent plates between which there is an optical medium having a refractive index which is not equal to one.

25. The device according to claim 22, 23 or 24 wherein the plates are made from glass whose refractive indices are greater by a factor of 1.15 to 1.3 than the refractive index of the cement material or the optical medium (6).

26. The device according to claim 1 wherein a light source inside the camera lights up the stationary disc.

27. The device according to claim 1 wherein the movable disc comprises a matted side opposite a non-matted side, wherein the non-matted side faces a lens of the camera and wherein the stationary disc with image field markings faces the matted side of the movable disc.

28. The device according to claim 1 wherein the movable disc comprises a matted side opposite a non-matted side, wherein the movable disc matted side faces a lens of the camera and wherein the stationary disc with the image field marking faces the non matted side of the movable disc.

29. The device according to claim 27 or 28 wherein the stationary disc is mounted in an incident beam direction behind the movable disc and is formed convex on its side remote from the image field marking to form a field lens.

30. The device according to claim 1 wherein the stationary disc comprises a normal glass side facing a camera lens and the non-matted side of the movable disc wherein a matted side of the movable disc faces the image field marking of the stationary disc.

31. The device according to claim 1 wherein the movable disc comprises: two parallel translucent plates, wherein one of the two plates has an inner side having a light scattering surface; and an optical medium sandwiched between the two plates.

32. The device according to claim 31 wherein the material of the two plates has a refractive index which is at least 1.1 times greater than the refractive index of the optical medium.

* * * * *